United States Patent
Slatter et al.

(10) Patent No.: US 7,309,054 B2
(45) Date of Patent: Dec. 18, 2007

(54) UNIVERSAL CLAMP

(75) Inventors: Stephen O. Slatter, Sunrise, FL (US); William E. Kushner, Miami, FL (US); Michael Burnley, Hollywood, FL (US)

(73) Assignee: Taco Metals, Inc., Miami, FL (US)

( * ) Notice: Subject to any disclaimer, the term of this patent is extended or adjusted under 35 U.S.C. 154(b) by 0 days.

(21) Appl. No.: 10/852,363

(22) Filed: May 24, 2004

(65) Prior Publication Data

US 2004/0238714 A1    Dec. 2, 2004

Related U.S. Application Data

(60) Provisional application No. 60/486,832, filed on Jul. 11, 2003, provisional application No. 60/473,660, filed on May 27, 2003.

(51) Int. Cl.
*F16M 13/00* (2006.01)
*A01K 97/10* (2006.01)

(52) U.S. Cl. .................. 248/521; 43/21.2; 248/538; 248/541

(58) Field of Classification Search .......... 248/534, 248/230.5, 231.61, 316.6, 222.52, 68.1, 65, 248/74.1, 74.3, 230.1, 230.8, 515, 292.12, 248/520–521, 538, 540–541; 403/49, 174, 403/171, 175; 43/17, 21.2

See application file for complete search history.

(56) References Cited

U.S. PATENT DOCUMENTS

| | | | | |
|---|---|---|---|---|
| 970,751 A | * | 9/1910 | Pranke | 248/515 |
| 1,102,126 A | * | 6/1914 | Barnes et al. | 403/191 |
| 1,261,213 A | * | 4/1918 | Clay | 403/233 |
| 2,559,421 A | * | 7/1951 | Garrett | 248/515 |
| 2,876,027 A | * | 3/1959 | Sulmonetti | 403/53 |
| 3,422,829 A | | 1/1969 | Adams, Jr. | |
| 3,906,653 A | * | 9/1975 | Williams | 43/21.2 |
| 4,283,152 A | * | 8/1981 | Smith et al. | 403/3 |
| 4,733,471 A | * | 3/1988 | Rahe | 30/276 |
| 4,864,795 A | * | 9/1989 | Burg | 52/646 |
| 4,878,642 A | | 11/1989 | Kirby, Jr. | |
| 4,979,456 A | | 12/1990 | Steward | |
| 5,119,690 A | * | 6/1992 | Shu | 74/551.1 |
| 5,184,911 A | * | 2/1993 | Wu | 403/385 |
| 5,575,580 A | * | 11/1996 | Parrish et al. | 403/49 |
| 5,785,447 A | * | 7/1998 | Fonti et al. | 403/49 |
| 5,860,728 A | * | 1/1999 | Maglica | 362/191 |
| D408,885 S | * | 4/1999 | O'Neill | D22/147 |
| 6,030,142 A | * | 2/2000 | Malizia | 403/234 |
| 6,575,652 B2 | * | 6/2003 | Krauss | 403/49 |

(Continued)

OTHER PUBLICATIONS

Perko Catalog: "Fishing Rod Holders", Fishing Equipment, http://www.perko.com/Perko%20Catalog/Alphabetical%20Index/224228.pdf, pp. 224-227.

*Primary Examiner*—Carl D. Friedman
*Assistant Examiner*—Tan Le
(74) *Attorney, Agent, or Firm*—Robert M. Schwartz; Alfred K. Dassler

(57) ABSTRACT

A clamp assembly is disclosed including a clamp support half having an attachment end, the attachment end engaging a supporting structure, a lower clamp half releasably secured to the clamp support half, and wherein the lower clamp half accommodates an anti-rotation pin to prevent rotation about a longitudinal axis of the clamp assembly.

5 Claims, 4 Drawing Sheets

U.S. PATENT DOCUMENTS 6,860,029 B2 * 3/2005 Haynes .................... 33/645
2002/0100852 A1 * 8/2002 Eason et al. ........... 248/292.12
2004/0232292 A1 11/2004 Slatter et al.
2004/0238714 A1 * 12/2004 Slatter et al. ............... 248/534
2007/0044367 A1 * 3/2007 Slatter ....................... 43/21.2

* cited by examiner

UNIVERSAL CLAMP

CROSS-REFERENCE TO RELATED APPLICATIONS

This application claims the benefit of U.S. Provisional Application Ser. No. 60/473,660, filed on May 27, 2003, entitled CLAMP-ON CENTER RIGGER MOUNT and U.S. Provisional Patent Application Ser. No. 60/486,832, filed on Jul. 11, 2003, entitled UNIVERSAL CLAMP.

TECHNICAL FIELD OF THE INVENTION

This invention relates generally to the field of sport fishing. More particularly, the present invention relates to clamps that may be applied to supporting structures of a boat for securely holding or supporting accessories such as an outrigger, lamp, fishing rod, cutting surfaces, or any other structural framework, for use for facilitating the overall convenient usage of the vehicle.

BACKGROUND OF THE INVENTION

Various styles of brackets have long been used in the art for holding other items. Brackets and frame works have had known usage in the boat field, for use for holding frameworks, for supporting covers, as for enclosure and covering purposes. In addition, brackets have long been used for securement to other structures, even for application for holding other types of items, either during usage, or for storage.

Examples of the early type of use of bracketing arrangements, as for example, that may be fastened to the rim or gunwale of a boat, and held in position by means of its sockets, can be found in U.S. Pat. No. 3,422,829. While the overall principle of the lifeboat cover as shown in this patent may provide coverage for a boat, the actual structure of the bracketing means, and the framework involved, is distinct from the current invention.

The patent to Kirby, Jr., U.S. Pat. No. 4,878,642, shows an object support for attachment to a cylindrically shaped support member. This disclosure shows a clamp member that is generally C-shaped, and is used for clamping onto a supporting member, and then for application for holding a variety of other components, one of which is even defined and shown as a support for a plurality of different diameter fishing poles. It can also be seen that this device can be used for holding a can, drinking glass, cup, or the like. The C-clamp for holding a structural support, or holding other accessories is quite distinct from the current invention when viewed in comparison to the overall attachment as disclosed in this Kirby patent.

The patent to Steward, U.S. Pat. No. 4,979,456, shows a portable blind for attachment to a boat. It includes a series of interconnecting frames or attachment means, which are secured by means of U-shaped brackets, to the side walls of a boat.

SUMMARY OF THE INVENTION

Accordingly, the present invention addresses the need for a novel accessory clamp by providing a universal clamp assembly.

In accordance with the preferred embodiment of the present invention, there is provided a clamp assembly including a clamp support half having an attachment end, the attachment end engaging a supporting structure, a lower clamp half releasably secured to the clamp support half, and wherein the lower clamp half accommodates an anti-rotation pin to prevent rotation about a longitudinal axis of the clamp assembly.

BRIEF DESCRIPTION OF THE FIGURES

FIG. 2b is an isometric view of the outer surface of the lower cap half of FIG. 2a.

DETAILED DESCRIPTION OF THE INVENTION

Figure 1:
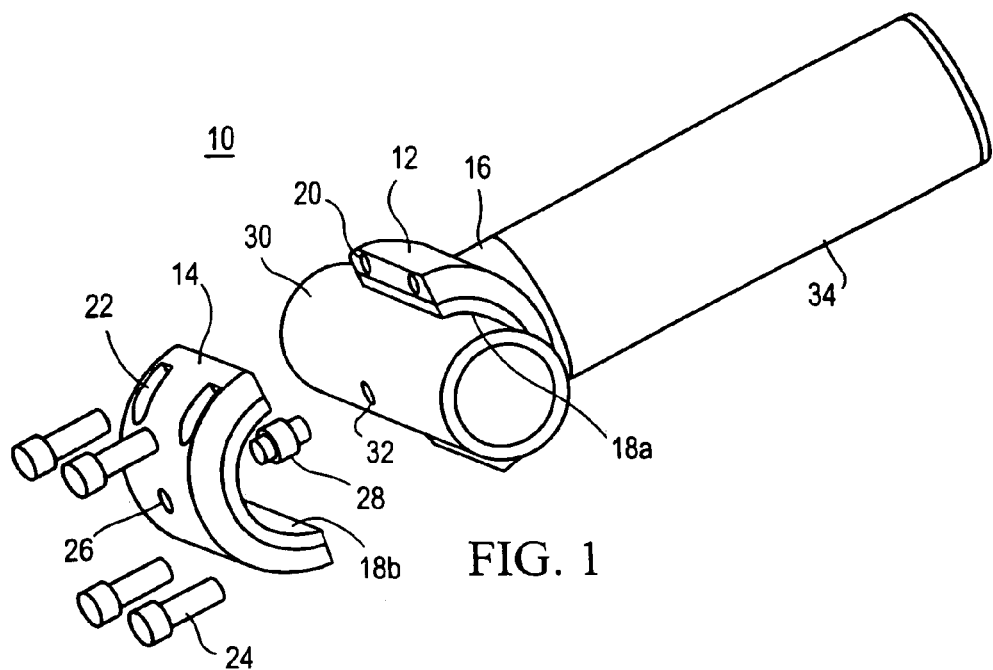
FIG. 1 is an exploded isometric view of the preferred embodiment of the present invention.

Referring now to FIG. 1, the preferred embodiment of the present invention is illustrated as clamp assembly 10. Clamp assembly 10 includes a clamp support half 12 and lower clamp half 14.

Clamp support half 12 includes attachment end 16, fitting 18a, and internally threaded bores 20. Clamp support half 12 utilizes attachment end 16, as discussed in detail below, so as to engage a supporting structure, such as support tube 34. Attachment end 16 is formed from an extension of clamp support half 12 and can be shaped so as to accommodate a variety of support structures, as detailed with reference to FIGS. 4, 5 and 6. Clamp support half 12 further utilizes fitting 18a to partially frictionally engage a structure, such as mounting tubing 30. Internally threaded bores 20 of clamp support half 12 receive fasteners 24 to securely align clamp support half 12 with lower clamp half 14 threaded bores 20 being preferably counter-bored so as to eliminate the need for a flange.

Figure 2A:
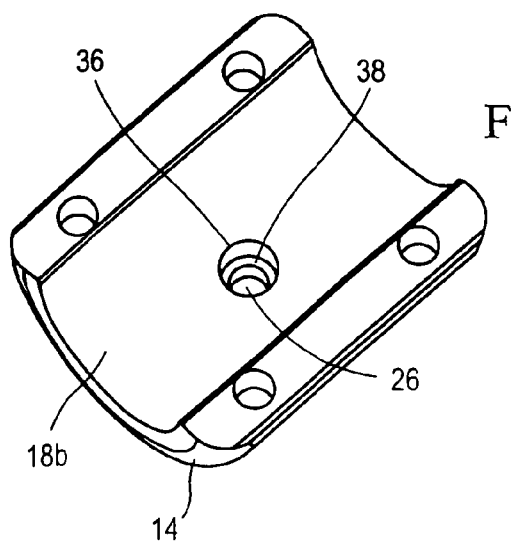
FIG. 2a is an isometric view of the inside bore face of the lower cap half of FIG. 1.
Figure 2B:
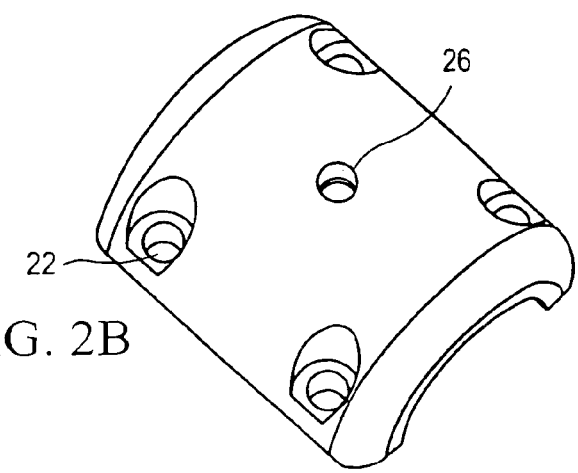

Lower clamp half 14, as illustrated in FIGS. 1, 2a, and 2b, preferably includes an internal bore face 18b, bores 22, and clamp pilot hole 26. As with fitting 18a of clamp support half 12, fitting 18b allows lower clamp half 14 to also partially frictionally engage a structure, such as mounting tubing 30 fittings 18a and 18b can be of varying size so that boat tubing of different circumferences may be engaged. As is shown in FIGS. 1, 2a, and 2b, fitting 18b preferably incorporates clamp pilot hole 26. FIG. 2a illustrates clamp pilot hole 26 passing through fitting 18b. Clamp pilot hole 26 incorporates a retaining bore 36 having a retaining shoulder 38. Retaining bore 36 accommodates an anti-rotation pin 28 (as illustrated in FIG. 1).

Additionally, clamp pilot hole 26 is employed to provide a guide for marking tubing for drilling a hole in a desired tubing location, the hole for frictionally receiving anti-rotation pin 28. As shown in FIG. 2b, lower clamp half 14 incorporates bores 22. In operation, as further shown with reference to FIG. 3, bores 22 align with internally threaded bores 20 so that fasteners 24 can partially pass through bores 22 and operationally engage internally threaded bores 20. In this way, clamp support half 12 can be releasably secured to lower clamp half 14 so as to encompass an outer region of a structure, such as mounting tubing 30.

Figure 3:
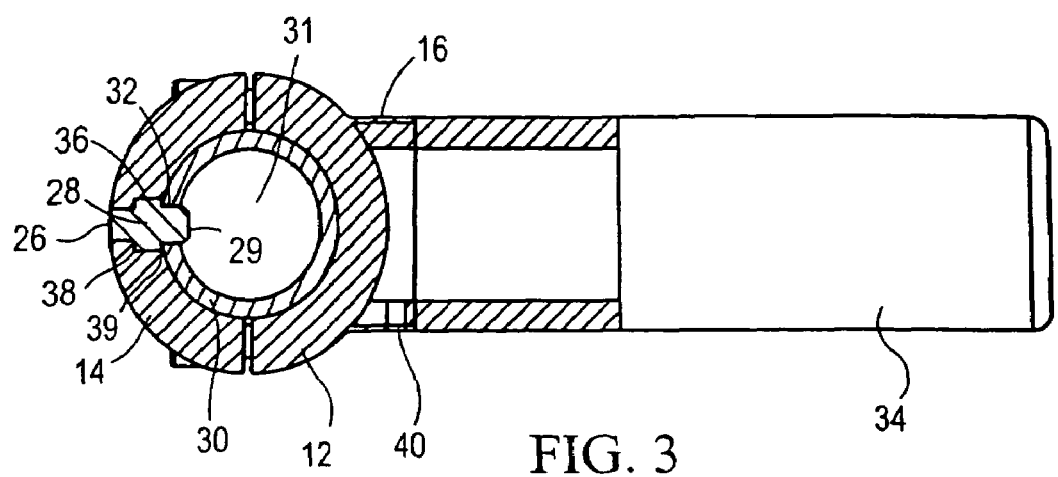
FIG. 3 is a side view illustration of the present invention of FIG. 1.

Referring now to FIG. 3, clamp support half 12 is illustrated releasably secured to lower clamp half 14. As is shown, anti-rotation pin 28 is positioned in retaining bore 36, abutting retaining shoulder 38. Thus, retaining shoulder 38 prevents anti-rotation pin 28 from traveling out of pilot hole 26. Preferably, mounting tubing 30 incorporates a pilot hole 32 to accommodate a portion of anti-rotation pin 28. Anti-rotation pin 28 terminates with protruding tip 29, which passes through mounting tube 30 and into tube cavity 31, with retaining shoulder 39 halting further penetration of anti-rotation pin 28 into tube cavity 31. By entering tube cavity 31, anti-rotation pin 28 prevents clamp assembly 10 from rotating about mounting tube 30.

As is further illustrated in FIG. 3, attachment end 16 operatively engages support tube 34. Support tube 34 can be used to support a variety of structures, including but not limited to outrigger booms. Preferably, attachment end 16 further incorporates at least one drainage hole, so that water entering support tube 34 can be passed out of the internal areas of attachment end 16 and support tube 34.

Figure 4:
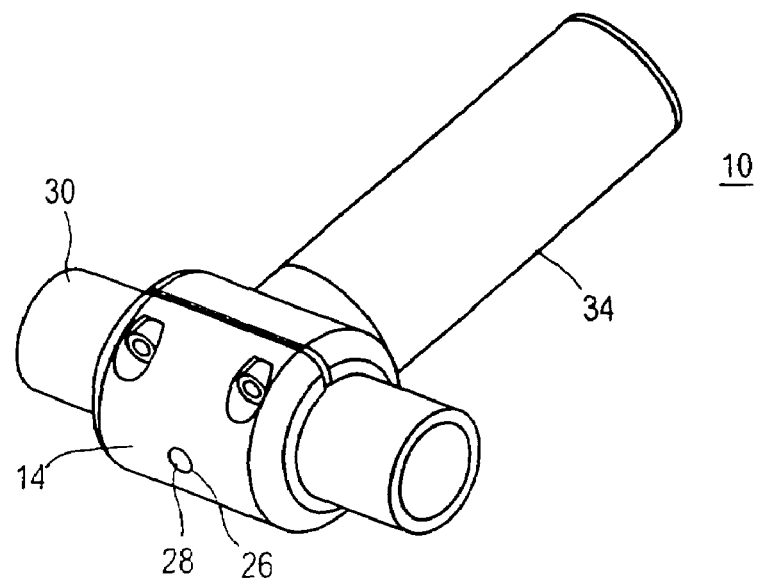
FIG. 4 is an isometric view of the present invention of FIG. 1 in operation.

Referring now to FIG. 4, clamp assembly 10 is illustrated showing anti-rotation pin 28 aligned with pilot hole 26 of lower clamp half 14. As such, the use of anti-rotation pin 28 permits clamp assembly 10, and therefore support to be held in a particular orientation. Thus, an outrigger boom (or other structure) positioned within support tube 34 is also maintained in position. It is preferable that mounting tube 30 incorporate several pilot holes similar to pilot hole 32, but in varying orientations. Such varying orientations permit clamp assembly 10 and support tube 34 to be positioned according to the desires of a user.

Figure 5:
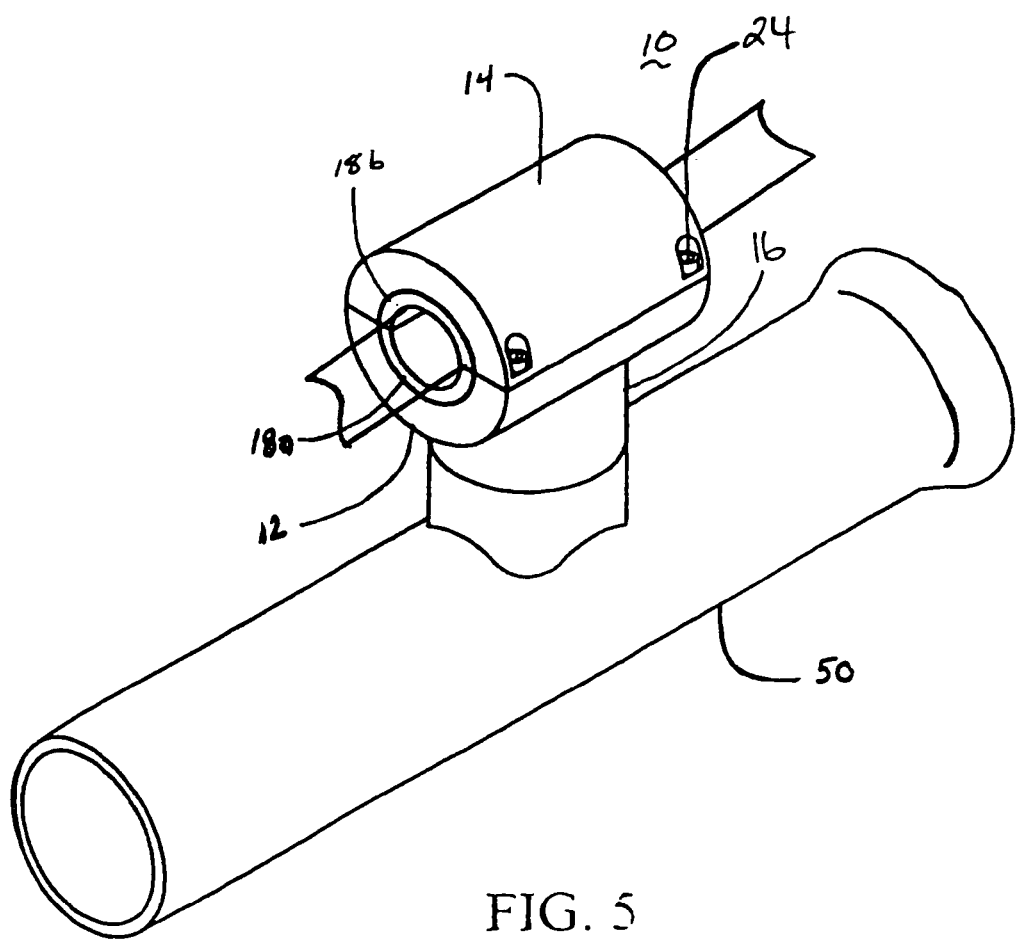
FIG. 5 is an isometric view illustration of an alternative embodiment of the present invention of FIG. 4.
Figure 6:
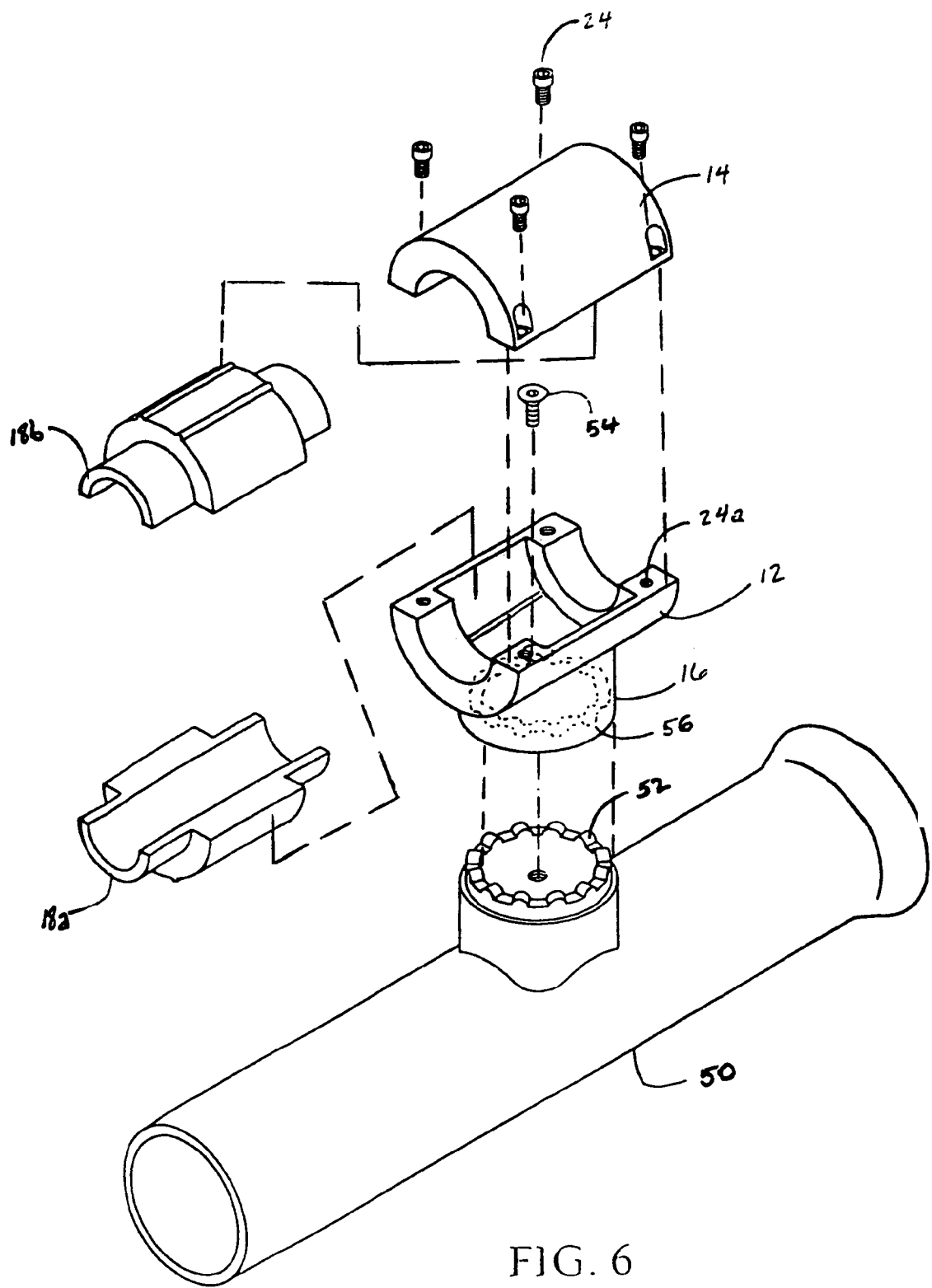
FIG. 6 is an exploded isometric view of the alternative embodiment of the present invention of FIG. 5.

Referring now to FIGS. 5 and 6, an alternative embodiment of the present invention is illustrated. As illustrated in FIG. 5, clamp assembly 10 is alternatively shown operatively engaged to fishing rod holder 50. Fishing rod holder 50 is preferably operatively engaged to clamp assembly 10 by way of an attachment end 16, and is secured to clamp assembly 10 at attachment end 16 by a fastener 54 (shown in FIG. 6). As illustrated in FIG. 6, fishing rod holder 50 incorporates teeth 52. Teeth 52 are positioned so as to mate with opposing teeth 56 of attachment end 16. The mating of teeth 52 with concealed teeth 56 assists in preventing undesired rotation and allows fishing rod holder 50 to be adjustable relative to tube to which it is attached with respect to clamp assembly 10. Positioning teeth 56 of attachment end 16 in a first position with respect to teeth 52 is performed by the user, the first position (not shown) held by fastener 54 engaging attachment end 16 to fishing rod holder 50 and thereby releasably securing fishing rod holder 50 to attachment end 16 so as to prevent fishing rod holder 50 from undesired rotation. When rotation is desired by the user, fastener 54 is sufficiently loosened allowing teeth 52 to be placed in a second position, thereby permitting fishing rod holder 50 to tilt with respect to clamp assembly 10. Fastener 54 is then tightened so that the second position is maintained.

In operation, first fitting 18a and second fitting 18b frictionally engage a boat structure, such as tubing, and further function as insulators. Clamp support half 12 and lower clamp half 14 accommodate fittings 18a and 18b, respectively, and are releasably secured to one another and tightened around the boat structure by way of fasteners 24 into openings 24a. Fittings 18a and 18b are releasable and replaceable with third and fourth fittings, respectively, so that tubing of varying circumferences can be secured. Preferably, fastener 54 releasably secures attachment end 16 of clamp support half 12 to fishing rod holder 50 prior to the engagement of the boat structure. Once engaged to the boat structure, the user can position a fishing rod in fishing rod holder 50.

Although only a few exemplary embodiments of the present invention have been described in detail above and in the following Figures, those skilled in the art will readily appreciate that numerous modifications to the exemplary embodiments are possible without materially departing from the novel teachings and advantages of this invention. Accordingly, all such modifications are intended to be included within the scope of this invention as defined in the following appended claims.

What is claimed is:

1. A clamp-on fishing rod holder assembly comprising:
   a rod holder tube having two opposing ends and a tube outer circumference, said outer circumference being continuous;
   a substantially round projection disposed on said tube outer circumference between said two opposing ends;
   a clamp support half having two opposing longitudinal ends and an outer circumference;
   a substantially round attachment end disposed on said outer circumference between said two opposing longitudinal ends, said round attachment end being directly attached to said round projection;
   said round attachment end having planar surface having teeth disposed thereon and said round projection having a planar surface with teeth disposed thereon, said teeth of attachment end engaging with said teeth of said projection for holding said rod holder tube in place; and
   a lower clamp half attached to said clamp support half for forming a mounting diameter for clamping to a structure of a boat.

2. The assembly according to claim 1, wherein said round attachment end and said round projection are attached together with a screw.

3. The assembly according to claim 1, further comprising a first fitting disposed on an inner circumference of said clamp support half and a second fitting disposed on an inner circumference of said lower clamp half, said first and second fittings reducing said mounting diameter.

4. The assembly according to claim 3, wherein said first and second fittings each have respective ridges disposed on an outer circumference and extending parallel to a longitudinal axis of said first and second fittings, said ridges preventing said first and second fittings from rotating with respect to said clamp support half and lower clamp half.

5. The assembly according to claim 3, wherein said first and second fittings are provided in different sizes for reducing said mounting diameter to different sizes.

* * * * *